2,805,917

PROCESS FOR THE PREPARATION OF ZINC AND CADMIUM SULFIDES AND SELENIDES

Rudolf Nitsche, Parlin, N. J., assignor to E. I. du Pont de Nemours and Company, Wilmington, Del., a corporation of Delaware No Drawing. Application April 5, 1954,
Serial No. 421,191

10 Claims. (Cl. 23—50)

This invention relates to a process for the preparation of zinc and cadmium sulfides and selenides. More particularly it relates to such a process wherein these compounds are precipitated by means of hydrogen sulfide or hydrogen selenide.

Many processes for the preparation of zinc and cadmium sulfides and selenides are known. They are quite diverse and some require the use of expensive reactants and tedious procedures. The known processes of preparing zinc sulfide from zinc salts, e. g., zinc chloride in aqueous solution and $H_2S$, while simple, have the disadvantage that the zinc sulfide is not of adequate purity for many special purposes. The conventional method of preparing zinc selenide from an aqueous solution of a zinc salt by the addition of $H_2Se$ has a similar disadvantage. In addition, the yields are much less than theoretical, due to the incomplete absorption of $H_2Se$ by the aqueous solution. A serious disadvantage is that the product is a mixture of $ZnSe$, $Zn(OH)_2$ and $Se$. This is because $H_2Se$ and $ZnSe$ are readily oxidized, in the presence of air and moisture, into $Se$. The precipitate, moreover, has a gel-like structure and is extremely difficult to filter. Further oxidation occurs during the filtration. Cadmium selenide and $H_2Se$ are unstable in the presence of air and moisture and when used in the prior art procedure give impure products.

An object of this invention is to provide improved processes for the preparation of zinc and cadmium selenides and sulfides. Another object is to provide such processes which are simple, but yield these metal chalcogenides in a high degree of purity. A further object is to provide such processes which give high yields. Still other objects will be apparent from the following description of the invention.

It has been discovered that zinc and cadmium sulfides and selenides can be prepared, in high yields and pure form, by dissolving a zinc or cadmium salt of a weak acid in an alkanol of 1 to 5 carbon atoms, passing gaseous $H_2S$ or $H_2Se$ through the solution while maintaining said solvent under conditions of reflux, and recovering the metal chalcogenide. The latter can be accomplished by removing the precipitated metal chalcogenide and filtering it free from entrained solvent. The precipitate can then be washed with additional solvent and dried at an elevated temperature, e. g., between 60° C. and 120° C. and preferably at reduced pressure, e. g., 20 mm. and less to 190 mm. of mercury and more.

Various zinc and cadmium salts of weak acids, which salts are soluble in the alkanols, can be used. Suitable salts include zinc acetate, cadmium acetate, zinc propionate, zinc salicylate, zinc valerate, zinc oleate, zinc caprolate, zinc ethyl sulfate; zinc ammonium chloride, cadmium ammonium chloride, and cadmium ammonium bromide. With the exception of zinc oleate, these salts are soluble in water. The salts may be anhydrous or hydrous. The acetates constitute the preferred salts.

Since the zinc and cadmium salts used often contain traces of heavy metals, it is desirable to precipitate them with the hydrogen chalcogenide, remove them in the form of a metal sulfide or selenide from the system, and then to continue the precipitation of the zinc or cadmium chalcogenides.

While any of the alkanols of 1 to 5 carbon atoms including methanol, ethanol, propanol, isopropanol, butanols, and the pentanols and mixtures, are useful, the preferred solvents are methanol and ethanol. The proportion of alkanol to salt may vary widely and depends upon the particular salt and solvent. A preferred range of proportion is 0.10 to 0.15 part of salt per part, by weight, of solvent.

The reaction can be carried out in any suitable vessel which is provided with means for introducing the hydrogen chalcogenide near the bottom of the body of solvent and with reflux means so that a mass of solvent vapor is maintained above the surface of the liquid reaction medium and solvent and entrained hydrogen chalcogenide is continuously condensed and returned to the reaction zone. For small scale operations a heat-resistant glass vessel which is provided with a gas induction tube and a reflux condenser is satisfactory. In the case of large scale operations, a column still can be used. The reaction, normally, will be carried out until all of the metal salt is converted to the chalcogenide. In general, 2 to 6 hours are sufficient. The process, if desired, can be carried out on a continuous scale.

The invention will be further illustrated but is not to be limited by the following examples.

Example I

Six hundred (600) grams of zinc acetate was dissolved in 8 liters of distilled methanol in a glass reaction vessel provided with a reflux condenser and a small amount of $H_2Se$ was passed through the solution to precipitate traces of heavy metals together with some $ZnSe$. After standing overnight the solution was filtered, heated to boiling and a stream of $H_2Se$ passed through, while maintaining conditions of reflux. The reaction was complete after four hours. The yellowish-white precipitate of zinc selenide was filtered, washed with hot methanol and dried in vacuo at 110° C.

Yield: 396 grams $ZnSe = 95\%$.

Example II

Six hundred and ninety-six (696) grams of cadmium acetate was dissolved in 8 liters distilled methanol in a glass reaction vessel provided with a reflux condenser and a small amount of $H_2Se$ was passed through the solution to precipitate traces of heavy metals together with some $CdSe$. After standing overnight the solution was filtered, heated to boiling and a stream of $H_2Se$ passed through it, while maintaining conditions of reflux. The reaction was complete after four hours. The reddish-brown precipitate of cadmium selenide was filtered, washed with hot methanol and dried in vacuo at 110° C.

Yield: 480 grams $CdSe = 96\%$.

Example III

Forty-three and nine-tenths grams (43.9 g.) of pure $Zn(CH_3COO)_2 \cdot 2H_2O$ was dissolved in 300 cc. of distilled methanol in an apparatus as described in Example I. The solution was heated to boiling and a stream of $H_2S$ gas was bubbled through the boiling solution, while maintaining conditions of reflux, for a period of 30 minutes. The zinc sufide was filtered, washed with methanol and dried in vacuo at 110° C.

Yield: 19.09 grams $ZnS = 97.4\%$.

Example IV

Fifty-three grams (53.0 g.) of pure $$Cd(CH_3COO)_2 \cdot 2H_2O$$

was dissolved in 400 cc. of distilled methanol in an apparatus as described in Example I. The solution was heated to boiling and a stream of H₂S gas was bubbled through the boiling solution while maintaining conditions of reflux for a period of 30 minutes. The cadmium sulfide was filtered, washed with methanol and dried in vacuo at 110° C.

Yield: 28.1 grams CdS=98%.

Results similar to those described in the foregoing examples can be obtained by substituting any of the other alcohols described above. The process can be carried out batchwise or in a continuous manner.

The zinc and cadmium sulfides and selenides obtained in accordance with this invention, being of high purity, are useful for many purposes where pure products are desired. They are especially useful as base materials for luminescent compounds and compositions. Thus, they are very useful in the manufacture of luminescent materials for cathode ray tubes, fluorescent materials for fluoroscopic screens, for luminescent paints and television phosphors particularly for color television.

An advantage of the invention is that it provides simple and practical processes for making zinc and cadmium sulfides and selenides. Another advantage is that it provides such products of a high degree of purity. A further advantage is that high yields are obtained by complete utilization of the H₂S or H₂Se. A still further advantage is that the products are obtained in such a form they are readily filterable.

Other advantages are that good yields can be used with commercial grades of alcohols and the zinc salts. The processes are quite useful, however, with anhydrous alcohols and salts.

The embodiments of the invention in which an exclusive property or privilege is claimed are defined as follows:

1. The process of making a metal chalcogenide taken from the group consisting of zinc sulfide, zinc selenide, cadmium sulfide and cadmium selenide which comprises dissolving in an alkanol of 1 to 5 carbon atoms a salt taken from the group consisting of zinc and cadmium salts of weak acids, which salts are soluble in such alkanols, passing into the solution a gaseous hydrogen chalcogenide taken from the group consisting of hydrogen sulfide and hydrogen selenide while maintaining said solution under conditions of reflux, and recovering the precipitated metal chalcogenide.

2. The process of making a metal chalcogenide taken from the group consisting of zinc sulfide, zinc selenide, cadmium sulfide and cadmium selenide which comprises dissolving in an alkanol of 1 to 5 carbon atoms a salt taken from the group consisting of zinc and cadmium salts of weak acids, which salts are soluble in such alkanols, passing into the solution a gaseous hydrogen chalcogenide taken from the group consisting of hydrogen sulfide and hydrogen selenide while maintaining said solution under conditions of reflux, filtering the precipitated metal chalcogenide and washing the precipitate.

3. The process of making a metal chalcogenide taken from the group consisting of zinc sulfide, zinc selenide, cadmium sulfide and cadmium selenide which comprises dissolving a salt taken from the group consisting of zinc and cadmium salts of weak acids in an alkanol of 1 to 5 carbon atoms, which salts are soluble in such alkanols, passing into the alkanol solution a gaseous hydrogen chalcogenide taken from the group consisting of hydrogen sulfide and hydrogen selenide while maintaining said alkanol solution under conditions of reflux, filtering the precipitated metal chalcogenide and washing the precipitate with a said alkanol and drying the resulting metal chalcogenide.

4. A process as set forth in claim 3 wherein said salt is the acetate.

5. A process as set forth in claim 4 wherein said solvent is methanol.

6. The process of making cadmium selenide which comprises dissolving cadmium acetate in methanol, passing gaseous H₂Se into said methanol solution while maintaining the solution under conditions of reflux until conversion to CdSe is essentially complete, filtering the latter from the solution, washing the CdSe, and drying the latter.

7. The process of making zinc selenide which comprises dissolving zinc acetate in methanol, passing gaseous H₂Se into said methanol solution while maintaining the solution under conditions of reflux until conversion to ZnSe is essentially complete, filtering the latter from the solution, washing the ZnSe and drying the latter.

8. The process of making zinc selenide which comprises dissolving zinc acetate in methanol, passing gaseous H₂Se into said methanol solution while maintaining the solution under conditions of reflux until any heavy metal impurities are converted to metal selenides, removing the precipitated heavy metal selenides and continuing to pass gaseous H₂Se into the solution under conditions of reflux until conversion to ZnSe is essentially complete, filtering the latter from the solution, washing the ZnSe and drying the latter.

9. The process of making cadmium sulfide which comprises dissolving cadmium acetate in methanol, passing gaseous H₂S into said methanol solution while maintaining the solution under conditions of reflux until conversion to CdS is essentially complete, washing the CdS and drying the latter.

10. The process of making zinc sulfide which comprises dissolving zinc acetate in methanol, passing gaseous H₂S into said methanol solution while maintaining the solution under conditions of reflux until conversion to ZnS is essentially complete, washing the ZnS and drying the latter.

References Cited in the file of this patent

UNITED STATES PATENTS 2,354,742     Cunningham            Aug. 1, 1944

FOREIGN PATENTS 804,555     Germany               Apr. 26, 1951

OTHER REFERENCES

Mellor: "Treatise on Inorganic and Theoretical Chemistry," (1930), vol. 10, pages 776, 777 and 778.